April 20, 1937.    J. M. BIERER    2,077,508
METHOD OF MAKING MOLDED MATS
Filed Feb. 9, 1935    2 Sheets-Sheet 1
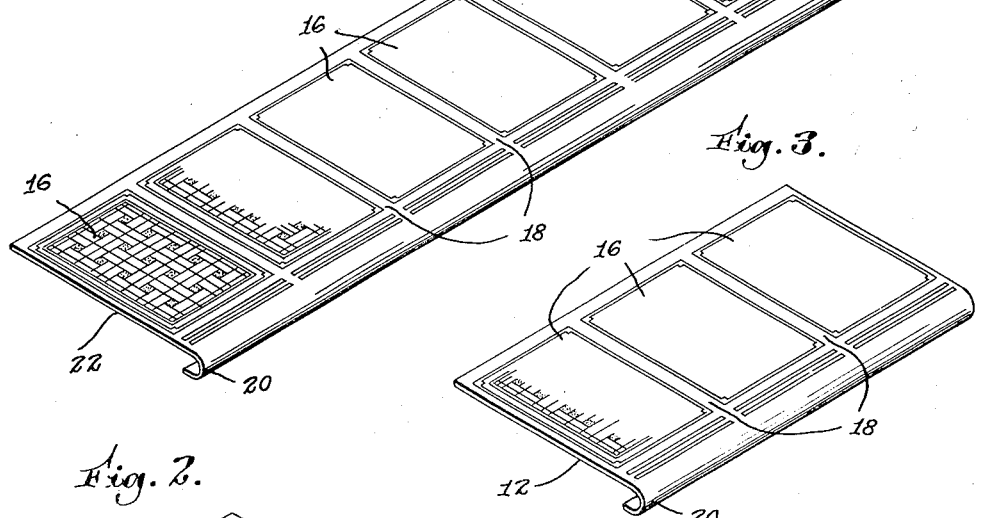
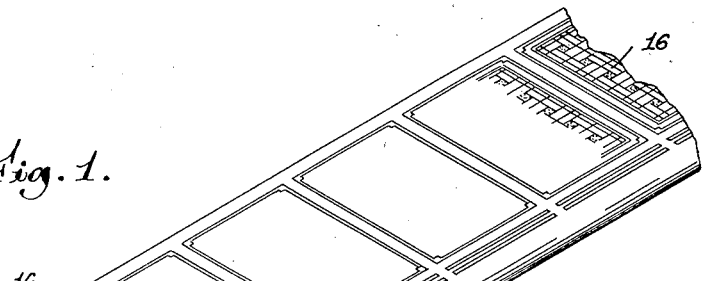
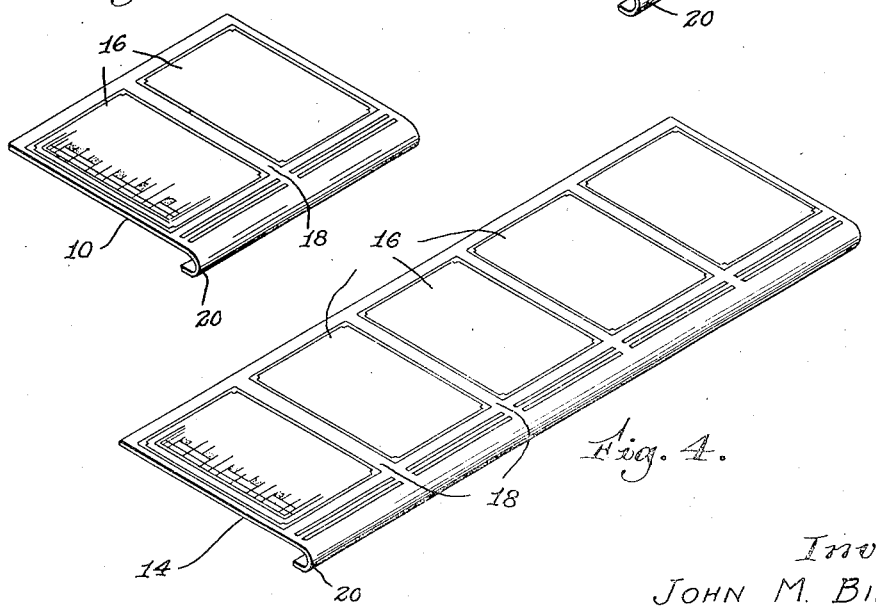
Inventor
JOHN M. BIERER
by Kenway & Witter
Attorneys April 20, 1937. J. M. BIERER 2,077,508
METHOD OF MAKING MOLDED MATS
Filed Feb. 9, 1935 2 Sheets-Sheet 2
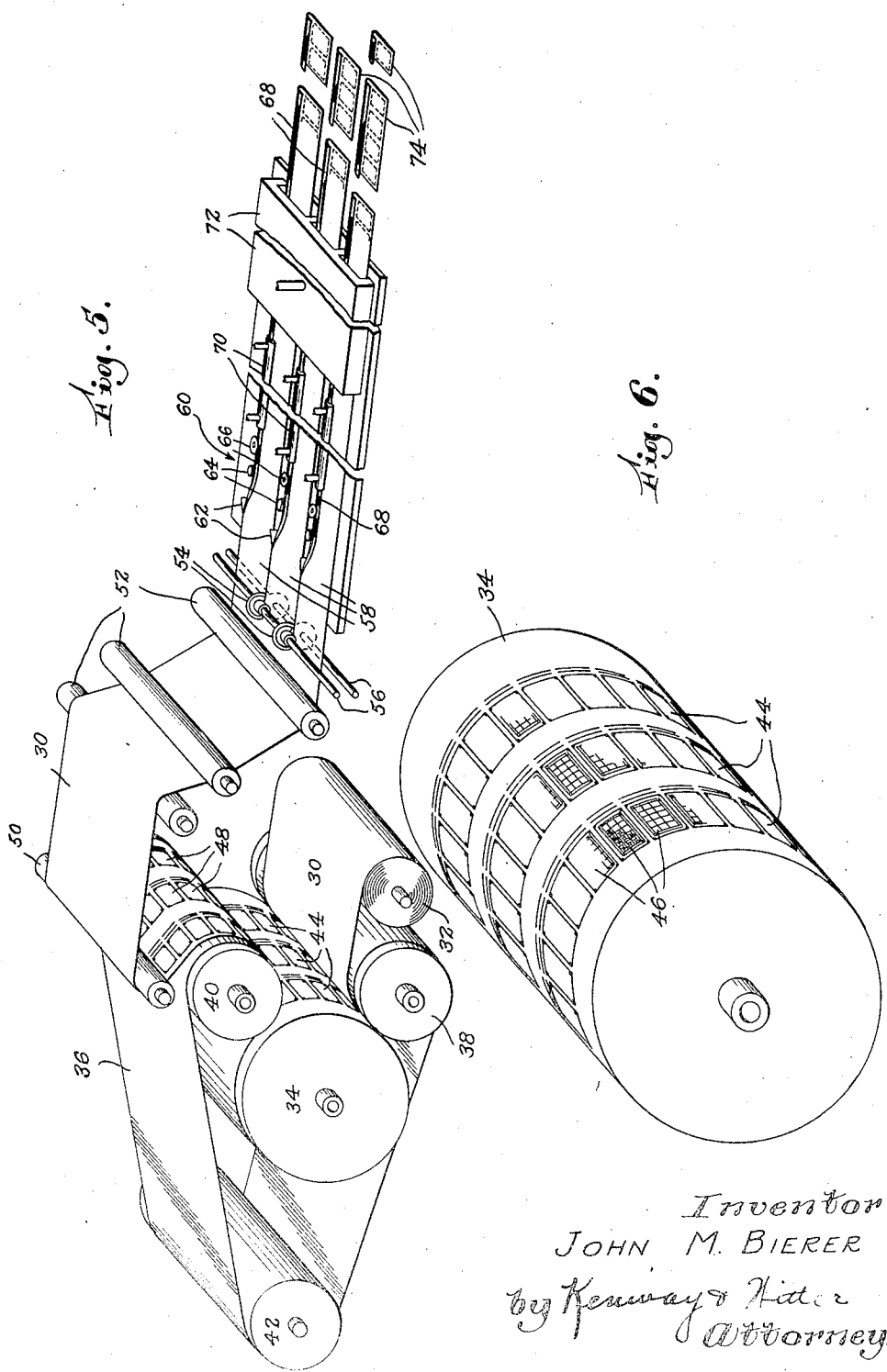
Inventor
JOHN M. BIERER
by Kenway & Witter
Attorneys Patented Apr. 20, 1937

2,077,508

UNITED STATES PATENT OFFICE 2,077,508

METHOD OF MAKING MOLDED MATS

John M. Bierer, Newton, Mass., assignor to Boston Woven Hose and Rubber Company, Cambridge, Mass., a corporation of Massachusetts Application February 9, 1935, Serial No. 5,722

3 Claims. (Cl. 18—56)

This invention relates to a novel and economical method of making design molded mats in a variety of predetermined sizes or lengths. It contemplates the molding of a continuous strip of plastic material with a standard design repeated in a series of units, the dimension of each unit longitudinally of the strip being a divisor common to the corresponding dimension of mats of all said predetermined sizes, whereby complete mats of these various sizes and embodying any desired number of said design units may be severed from the strip. Heretofore, mats having surface designs have been commonly molded in independent units by a process which is relatively slow and involves not only a considerable amount of labor but also requires the use of an extensive equipment of molds of different sizes. The primary object of the present invention is to make available the above and hereinafter described novel method of making molded mats continuously in strip form, and thereby eliminating much of the cost and labor incident to the methods heretofore known and used.

My invention is particularly applicable to the manufacture of stair tread mats of the type having a curved or rolled edge, as disclosed in the U. S. Patent No. 2,015,445. In accordance with that invention, a strip of tread material is treated continuously to curve and permanently set one longitudinal edge portion thereof to a predetermined edge curvature. When manufactured in accordance with the method of my invention, this curved edge strip is adapted to be cut up into stair tread mats of various selected predetermined sizes, as hereinafter more fully described, and thus the manufacture of curved edge stair treads may be carried out by the continuous treatment of plastic material in strip form.

The invention furthermore contemplates a more extensive phase of the above described method wherein a relatively wide strip of plastic material is continuously treated to mold thereinto a plurality of series of repeated designs, the series extending longitudinally of the strip and being separated a uniform distance from each other whereby they may be severed to provide a plurality of sub-strips, each embodying a series of said repeated designs. In producing the said curved or rolled edge mats, these sub-strips pass from the severing position to edge curving mechanism which operates continuously thereon to curve and permanently set one longitudinal edge portion of each sub-strip to a predetermined edge curvature, and following this treatment the sub-strips are adapted to be cut up into tread mats of various selected predetermined sizes. Thus the method may be expanded to produce several sub-strips of mat units, limited in length only by the width of the main strip.

These and other features of the invention will be best understood and appreciated from the following description of a preferred embodiment thereof, selected for purposes of illustration and shown in the accompanying drawings, in which Fig. 1 is a perspective view of a strip of plastic material molded in accordance with my invention;

Figs. 2, 3 and 4 are perspective views of mats of various sizes formed by severing portions of predetermined lengths from the strip of Fig. 1;

Fig. 5 is a view in perspective disclosing a continuous method, in accordance with my invention, of treating plastic material in continuous strip form to produce the product shown in Figs. 1–4;

Fig. 6 is a perspective view of the impression vulcanizing cylinder of Fig. 5.

Molded mats for stair treads and similar uses have heretofore been commonly made in individual molds of sizes corresponding to the sizes of the mats to be produced. This practice has necessitated the separate handling and treatment of each mat and an extensive equipment of individual molds, and has given no assurance of a uniform product because the length of time the mats remain in the molds depends upon their proper presentation and removal by an operator or a number of different operators. My invention herein disclosed contemplates the continuous manufacture of molded-surface mats in strip form and in such manner that the necessity of individual handling of the mats and the use of extensive equipment embodying numerous molds of different sizes are avoided and a superior and more uniform product is produced at less cost than heretofore.

My invention is particularly applicable to the manufacture of stair tread mats of the type having one edge rolled or curved to fit around the edge of the stair tread to be covered and I have, therefore, in the accompanying drawings illustrated my invention as applied to the manufacture of mats of this type. Stair tread mats are manufactured in different lengths to fit different lengths of stair treads and it happens that most of these lengths are in multiples of six inches. Thus a tread with a width of nine inches may be made in the following sizes: 9″ x 12″, 9″ x 18″, 9″ x 24″, 9″ x 30″, 9″ x 36″, 9″ x 42″, 9″ x 48″, the different lengths of such treads being multiples of six inches. This fact has been taken advantage of in the manufacture of treads in accordance with my invention, which will now be described by reference to the accompanying drawings.

In accordance with my invention the individual mats of different sizes are formed from a continuous strip 22 of suitable rubber compound. This strip is manufactured by being advanced continuously through a vulcanizing machine having a vulcanizing drum with a surface configuration suitable to mold the repeated design units 16 into the strip, substantially as shown in Fig. 1 of the drawings. Thus the strip is molded to the desired design and vulcanized or cured all in one continuous operation. The edge 20 of the strip may then be rolled or curved continuously and permanently in like manner, as specifically described in the copending application above identified. Mats of various predetermined lengths may thereupon be produced merely by severing the strip within the areas 18 between selected design units 16, it being apparent that the dimension of each unit longitudinally of the strip is an aliquot divisor common to the corresponding dimensions of the mats shown in Figs. 2, 3 and 4.

Stair tread mats 10, 12 and 14 of different sizes are illustrated in Figs. 2, 3 and 4 of the drawings and it will be noted that these mats are made up of unit sections 16 of a length which is a common factor of all three of such mats. For example, the mats may be of nine inch width and each unit section 16, including the space or area 18 between adjacent units, may be of a length of six inches. In such case the mat 10 will be 9″ x 12″, the mat 12 will be 9″ x 18″, and the mat 14 will be 9″ x 30″. It will be understood that the areas 18 separating the adjacent units are of uniform width. Any selected design may be molded into the units 16 and, in accordance with my invention, this design is repeated in the different units of each mat. It will also be noted that the mats illustrated have one edge 20 rolled or curved to engage the edge of the stair tread.

In Figs. 5 and 6 I have illustrated one form of my continuous method for producing the curved edge mat treads shown in Figs. 1–4. A relatively wide strip 30 of rubber or like plastic material is drawn from a supply roll 32 into the bite between a heated vulcanizing cylinder 34 and an endless flexible metal band 36 passing around and held in pressure contact with a substantial peripheral portion of the cylinder. The band 36 passes from the cylinder over rolls 38 and 40 and from thence over a tensioning roll 42, which latter may be adjusted to the proper band tensioning position. The peripheral surface of the cylinder has engraved thereon three series 44 of repeated design units 46 which it is desired to impress into the strip, the series and units being spaced apart distances providing the proper margins on the product, as hereinafter described.

It will be clear that the strip 30, under pressure of the band 36, has molded thereinto the design units 46 at 48 and is vulcanized during its contact with the heated cylinder. The strip is then led over a roll 50 and guiding rolls 52 to rotary shearing knives 54 mounted on shafts 56, which knives sever the strip 30 into three sub-strips 58 each embodying a series of repeated design units 48 therealong. It will be noted that the lines of shear are such as to leave the three sub-strips 58 of equal width and also to leave a relatively wide margin on one side of the design units 48 and a relatively narrow margin on the other side thereof.

From the shearing knives 54 the sub-strips 58 pass to and are each operated upon by edge curving mechanism at 60. Each such mechanism embodies a deflecting plate 62 and rollers 64 and 66 which act upon the wide marginal edge of its strip 58 to bend or curve the same over substantially to U-shape, as shown at 68 in Fig. 5 and at 20 in Fig. 1. This curved edge 68 is then fed into and through a substantially tubular member or jacket 70 heated by steam or otherwise and wherein such edge is confined to U-shape and caused to be permanently set to the said curvature. Following the curving treatment, the strips are passed through a cooling chamber 72 wherein the strip is cooled for the purpose of retaining the full contour of curvature produced therein. This curving and cooling mechanism is more fully disclosed in the aforementioned Patent No. 2,015,445.

Following the edge curving and cooling treatment, the sub-strips 58 are adapted to be severed into tread mat units 74 of varying predetermined sizes, it being understood that such severing takes place along the areas 18 between the design units 16 or 48, as heretofore described in reference to Figs. 1–4. It will now be seen that by the use of my novel method design molded mat treads of varying predetermined sizes can be made continuously from a strip of plastic material, and furthermore that the method may be enlarged and the output correspondingly increased by operating upon a relatively wide strip adapted to form a plurality of sub-strips each embodying the said mat tread units in strip form, and it will furthermore be understood that the product produced is more uniform than it has been possible to produce by methods heretofore known.

Having thus described my invention, what I claim as new and desire to secure by Letters Patent is:

1. A method of making curved edge molded mats of different sizes from plastic strip material, consisting of continuously moving the strip longitudinally, molding thereinto during such movement a series of repeated design units separated from each other by areas of uniform width, the dimension of each unit longitudinally of the strip being a divisor common to the corresponding dimensions of mats of said different sizes, continuously molding into a permanent curve one longitudinal edge of the strip during said movement, and severing the strip between selected design units to provide curved edge molded mats of the desired different sizes.

2. The method of making curved edge molded mats of different sizes from plastic strip material, consisting of continuously moving the strip longitudinally, molding thereinto during such movement a plurality of series of units of repeated designs, the said series being parallel with each other longitudinally of the strip and the dimension of each unit longitudinally of the strip being a divisor common to the corresponding dimensions of mats of said different sizes, continuously severing the strip longitudinally thereof between adjacent series during said movement to form a plurality of sub-strips, progressively molding into a permanent curve one longitudinal edge portion of each sub-strip, and severing the sub-strips between selected design units to provide curved edge molded mats of the desired different sizes.

3. The method of making molded stair tread mats from sheet rubber material, which consists in continuously and progressively rolling and vulcanizing into one face of the rubber sheet a plurality of series of repeated design units of standard length, the units being uniformly spaced longitudinally of the sheet and the series being arranged in spaced longitudinal rows, severing the molded sheet into strips each containing one series of design units, and then severing the molded strips midway between selected adjacent units into individual mats, each mat containing a selected number of complete standard design units therein.

JOHN M. BIERER.